United States Patent
Suda

(10) Patent No.: US 8,655,269 B2
(45) Date of Patent: Feb. 18, 2014

(54) MOBILE WIRELESS COMMUNICATION SYSTEM INCLUDING RADIO RELAY TRANSMISSION FUNCTION

(75) Inventor: Kenji Suda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/618,331

(22) Filed: Sep. 14, 2012

(65) Prior Publication Data

US 2013/0012217 A1 Jan. 10, 2013

Related U.S. Application Data

(63) Continuation of application No. PCT/JP2010/056861, filed on Apr. 16, 2010.

(51) Int. Cl.
| | |
|---|---|
| H04B 3/36 | (2006.01) |
| H04B 1/60 | (2006.01) |
| H04B 7/15 | (2006.01) |
| H04B 1/00 | (2006.01) |
| H04B 7/00 | (2006.01) |
| H04W 72/00 | (2009.01) |
| H04L 5/04 | (2006.01) |
| H04J 1/16 | (2006.01) |
| H04J 3/00 | (2006.01) |
| H04J 3/16 | (2006.01) |

(52) U.S. Cl.
USPC ............... 455/7; 455/9; 455/11.1; 455/69; 455/450; 455/452.1; 455/452.2; 455/509; 455/510; 370/211; 370/229; 370/252; 370/280; 370/293; 370/310; 370/315; 370/464; 370/468

(58) Field of Classification Search
USPC ............. 455/452.2, 450, 7, 9, 11.1, 18, 69, 455/452.1, 509, 510; 370/229, 280, 293, 370/315, 329, 335, 342, 344, 338, 211, 252, 370/310, 464, 468
See application file for complete search history.

(56) References Cited

U.S. PATENT DOCUMENTS 7,321,571 B2 * 1/2008 Schnack et al. ............... 370/320
7,916,649 B2 * 3/2011 Buvaneswari et al. ....... 370/241
(Continued)

FOREIGN PATENT DOCUMENTS

| | | |
|---|---|---|
| JP | 2007-335943 | 12/2007 |
| JP | 2008-172762 | 7/2008 |
| JP | 2008-199579 | 8/2008 |
| WO | 2008/096436 | 8/2008 |
| WO | 2009/072191 | 6/2009 |

OTHER PUBLICATIONS

Nortel; "Discussion paper on the control channel and data channel optimization for relay link"; Agenda Item: 15.3; 3GPP TSG-RAN Working Group 1 Meeting #56bis; R1-091384; Seoul, Korea; Mar. 23-27, 2009.

(Continued)

Primary Examiner — Inder Mehra
(74) Attorney, Agent, or Firm — Myers Wolin, LLC

(57) ABSTRACT

A radio base station apparatus includes a determining unit that dynamically determines, based on both quality information and traffic information, collected for each of a first link used for direct communication between a first radio terminal and the base station apparatus, a second link used for direct communication between a second radio terminal and a fixed radio relay apparatus, and a third link used for relay transmission between the base station apparatus and the relay apparatus, of sub-frames in a radio frame as radio resources, a number of sub-frames to be allocated to the each of the first, second and third links and an allocation timing therefor; and a notifying unit that notifies the relay apparatus of allocation information including the number of sub-frames to be allocated to the third link used for the relay transmission and the timing therefor in a period of at least once in the frame.

7 Claims, 9 Drawing Sheets

SYS MOBILE WIRELESS COMMUNICATION SYSTEM

(56) References Cited

U.S. PATENT DOCUMENTS

| | | |
|---|---|---|
| 2008/0107063 A1 | 5/2008 | Oleszczuk |
| 2008/0171551 A1 | 7/2008 | Zhu et al. |
| 2010/0232347 A1* | 9/2010 | Yu et al. .................. 370/315 |
| 2010/0240388 A1 | 9/2010 | Nakatsugawa |
| 2011/0128893 A1* | 6/2011 | Park et al. ................ 370/279 |
| 2011/0235571 A1* | 9/2011 | Seo et al. ................. 370/315 |

OTHER PUBLICATIONS

International search report issued for corresponding International Patent Application No. PCT/JP2010/056861 mailed Jul. 13, 2010.
International preliminary report on patentability issued for corresponding International Patent Application No. PCT/JP2010/056861, mailed on Nov. 15, 2012.

* cited by examiner

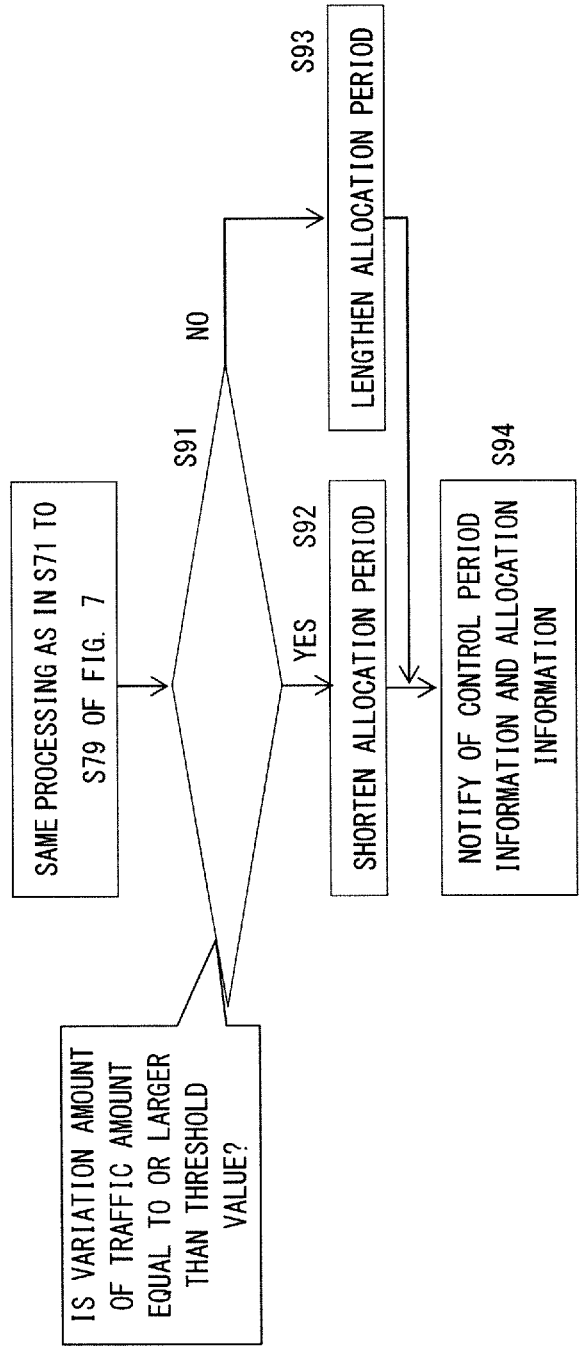

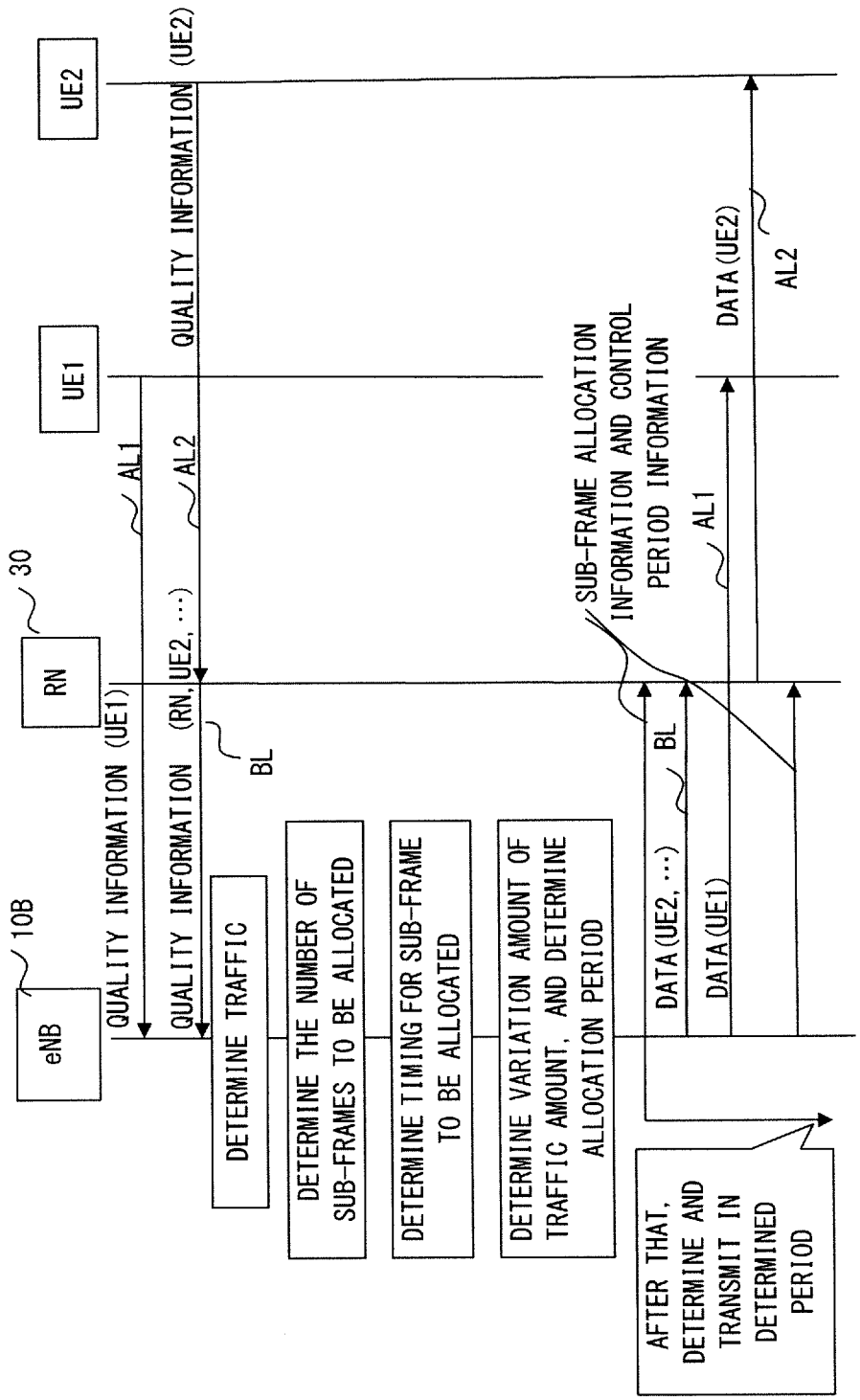

MOBILE WIRELESS COMMUNICATION SYSTEM INCLUDING RADIO RELAY TRANSMISSION FUNCTION

CROSS-REFERENCE TO RELATED APPLICATION

This is a continuation of application PCT/JP2010/056861, filed on Apr. 16, 2010, now pending, the contents of which are herein wholly incorporated by reference.

FIELD

The disclosures made herein relate to a mobile wireless communication system including a radio relay transmission function.

BACKGROUND

At present, as a next-generation mobile radio transmission technology, Long Term Evolution (LTE) is standardized by the 3rd Generation Partnership Project (3GPP). Moreover, as a further-advanced mobile radio transmission technology, LTE-Advanced is now under consideration. Under this consideration, in order to attain expansion of a cell coverage, that is, a communication area, and enhancement of a frequency usage efficiency, a fixed radio relay apparatus that does not move during communication is now being introduced.

In a mobile wireless communication system including a radio relay transmission function by the fixed radio relay apparatus (also referred to as relay node (RN) or relay station (RS)), as a technology for wireless connection between a radio base station apparatus (also referred to as base station (evolved Node B (eNB)), the relay node, and a radio terminal (user equipment (UE)) as a mobile station used by a user, there are two types of connection, specifically, the inband connection and the outband connection.

In the inband connection, the same frequency band as a frequency band used for direct communication between the base station and the radio terminal is used in different time periods to connect the base station and the relay node to each other. In the outband connection, a frequency band different from the frequency band used for the direct communication between the base station and the radio terminal is always used to connect the base station and the relay node to each other.

Some patent documents propose an example of the mobile wireless communication system employing such inband connection. In this mobile wireless communication system, the number of radio terminals and a radio quality (radio channel quality) in an access link and a backhaul link are collected, and in accordance with the number of radio terminals or the radio quality, allocation of an access zone and a relay zone as radio resources is determined. The access zone and the relay zone are separated from each other on the time axis, and notification of the allocation information is made for each sub-frame. In addition, as the radio quality, indexes such as a carrier to interference noise ratio (CINR), a received signal strength indicator (RSSI), and a signal to interference noise ratio (SINR) are used.

Other patent documents disclose the following scheduling technology. A data communication form in LTE is packet communication, and a resource block (RB) to be used for transmitting user data addressed to each mobile station is not determined in a fixed manner. Each mobile station measures a downlink channel reception quality (channel quality indicator (CQI)) of each resource block, and regularly reports the downlink channel reception quality to the base station. The base station determines, based on information such as a reported value of the CQI from each mobile station, a state of traffic, a property of communicated data (QoS), and information on whether or not communicated data is retransmitted data, the mobile station to which data is to be transmitted for each sub-frame.

The number of resource blocks to be used for transmitting data to each mobile station and the resource block to be used are selected in each case so that the resource block having as good a reception quality as possible is allocated. Information indicating the mobile station to which data is to be transmitted and information indicating the allocated resource block are communicated by using a control channel.

The following are related arts to the invention.

[Patent document 1] International Publication No. WO 2009/072191

[Patent document 2] International Publication No. WO 2008/096436

[Patent document 3] Japanese Patent Laid-Open Publication No. 2007-335943

[Patent document 4] Japanese Patent Laid-Open Publication No. 2008-172762

[Patent document 5] Japanese Patent Laid-Open Publication No. 2008-199579

SUMMARY

In the above-mentioned mobile wireless communication system including the radio relay transmission function by the relay node, when the number of radio terminals and a reception quality are used as conditions for determining allocation of the access zone and the relay zone, actual usage states of both the access link and the backhaul link cannot be determined, and hence a frequency usage efficiency is not greatly enhanced.

Further, when the base station notifies the relay node of the allocation information in each sub-frame of the radio frame, the relay node always receives the allocation information in each sub-frame, and hence not only control becomes complicated, but also a signaling amount increases.

According to an aspect of the disclosures made herein, a radio base station apparatus includes a determining unit that dynamically determines, based on both quality information and traffic information which are collected for each of a first link used for direct communication between a first radio terminal and the radio base station apparatus, a second link used for direct communication between a second radio terminal and a fixed radio relay apparatus, and a third link used for relay transmission between the radio base station apparatus and the fixed radio relay apparatus, of a plurality of sub-frames in a radio frame as radio resources, a number of sub-frames to be allocated to the each of the first link, the second link, and the third link and an allocation timing therefor; and a notifying unit that notifies the fixed radio relay apparatus of allocation information including the number of the sub-frames to be allocated to the third link used for the relay transmission and the allocation timing therefor in a period of at least once in the radio frame.

The objects and advantages of the invention will be realized and attained by means of the elements and combinations particularly pointed out in the claims.

BRIEF DESCRIPTION OF THE DRAWINGS

FIG. 9 is a flow chart illustrating radio resource allocation processing according to the modified example; and FIG. 10 is a sequence chart illustrating the radio resource allocation processing according to the modified example.

DESCRIPTION OF EMBODIMENTS

Figure 1:
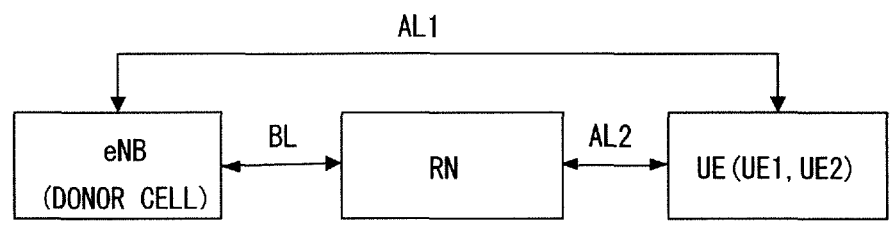
FIG. 1 illustrates a system configuration according to an embodiment and a modified example.

An embodiment of the disclosures made herein will be described below referring to the drawings in detail. The drawings illustrate a preferred embodiment. It should be understood, however, that the embodiment can be implemented by many different embodiments, and are not limited to the embodiment described herein.

Embodiment

[System]

Figure 2:
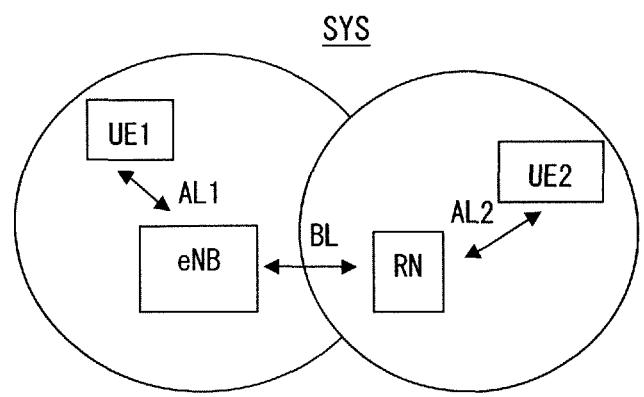
FIG. 2 illustrates the system configuration according to the embodiment and the modified example.

Referring to FIGS. 1 and 2, which illustrate a configuration of a system according to the embodiment, a mobile wireless communication system SYS including a radio relay transmission function in accordance with LTE includes a base station eNB as a radio base station apparatus, a relay node RN as a fixed radio relay apparatus, and radio terminals UE (UE1 and UE2) as mobile stations used by users. Note that, the mobile wireless communication system SYS that is actually constructed includes a large number of base stations eNB, relay nodes RN, and radio terminals UE, but illustration thereof is simplified in FIGS. 1 and 2.

In the mobile wireless communication system SYS, the base station eNB is placed in a donor cell, and is connected to an upper wired network (core network) and another base station (not shown) via predetermined wired interfaces, specifically, via an S1 interface and an X2 interface, respectively. As a technology for wireless connection between the base station eNB, the relay node RN, and the radio terminals UE, the inband connection is employed.

In the inband connection, the same frequency band as a frequency band used by the base station eNB and the radio terminal UE1 for directly communicating to/from each other via an access link AL1 is used in different time periods so as to connect the backhaul link BL between the base station eNB and the relay node RN. The radio terminal UE2 communicates to/from the relay node RN via an access link AL2, and is connected to the base station eNB by the radio relay transmission function of the relay node RN. The relay node RN functions as a base station with respect to the radio terminal UE2, and functions as a radio terminal as well with respect to the base station eNB.

In the mobile wireless communication system SYS, an orthogonal frequency division multiple access (OFDMA) signal is used for a downlink signal from the base station eNB toward the relay node RN and the radio terminal UE1, and a single carrier-frequency division multiple access (SC-FDMA) signal is used for an uplink signal from the relay node RN and the radio terminal UE1 toward the base station eNB. Further, an OFDMA signal is used for a downlink signal from the relay node RN toward the radio terminal UE2, and an SC-FDMA signal is used for an uplink signal from the radio terminal UE2 toward the relay node RN.

[Base Station]

Figure 3:
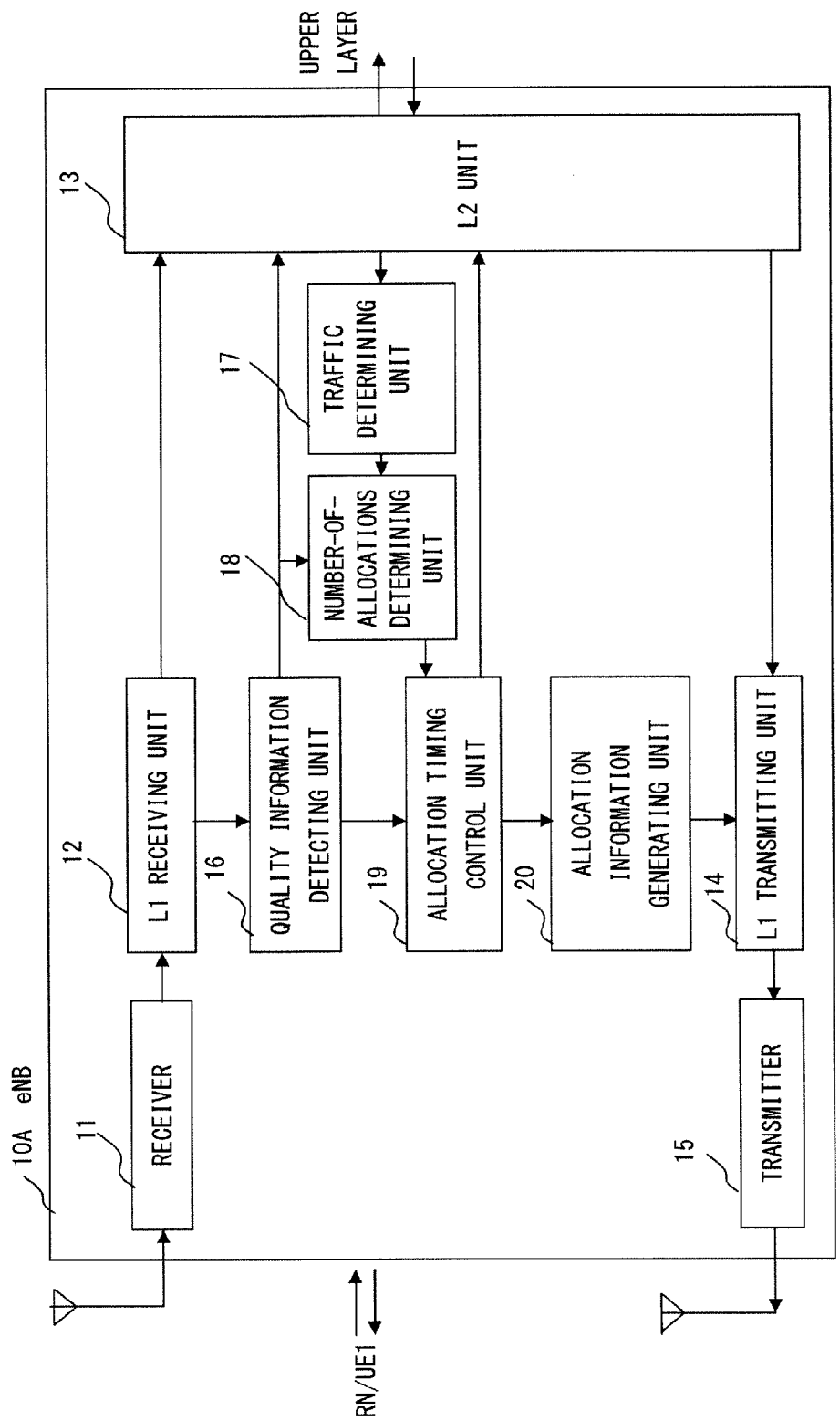
FIG. 3 illustrates a detailed configuration of a base station according to the embodiment.

FIG. 3 illustrates a detailed configuration of the base station eNB included in the mobile wireless communication system SYS according to the embodiment illustrated in FIGS. 1 and 2.

A base station eNB 10A illustrated in FIG. 3 includes a reception function part that processes the uplink signal (user data, quality information) that has been received from the relay node RN and the radio terminal UE1 via the backhaul link BL and the access link AL1, respectively, a transmission function part that processes the downlink signal (user data, control data) to be transmitted to the relay node RN and the radio terminal UE1 via the backhaul link BL and the access link AL1, respectively, and a control function part that controls (schedules) allocation of radio resources based on the collected quality information and traffic information.

The reception function part includes a receiver (radio reception unit) 11 and a layer 1 (L1) receiving unit 12. The receiver 11 receives an uplink radio frequency (ULRF) signal via an antenna, and converts the ULRF signal into a baseband (BB) signal (performs inverse frequency conversion on the ULRF signal). The L1 receiving unit 12 demodulates and decodes the BB signal input from the receiver 11 to reproduce data.

A layer 2 (L2) unit 13 included in the control function part performs layer 2 processing on the signal (user data, quality information) reproduced by the L1 receiving unit 12. The layer 2 processing includes conversion processing in Media Access Control (MAC), Radio Link Control (RLC), and Packet Data Convergence Protocol (PDCP). The L2 unit 13 sends the signal obtained after the conversion processing to an upper layer interfacing with the wired network.

The transmission function part includes a L1 transmitting unit 14 and a transmitter (radio transmission unit) 15. The L1 transmitting unit 14 encodes and modulates the signal obtained from the L2 unit 13 after the layer-2 conversion processing (for example, performs QPSK modulation on the signal), and after that, performs data modulation (OFDM modulation). The transmitter 15 converts the BB signal input from the L1 transmitting unit 14 into a downlink radio frequency (DLRF) signal (performs frequency conversion on the BB signal), and transmits the converted signal from an antenna.

The control function part includes the L2 unit 13, a quality information detecting unit 16, a traffic determining unit 17, a number-of-allocations determining unit 18, an allocation timing control unit 19, and an allocation information generating unit 20. Each of those components functions as a scheduler. The control function part further includes a main control unit (CPU) and a storage unit (not shown). The main control unit executes a base station control program stored in advance in the storage unit, to thereby control the overall operation of the base station eNB 10A. The downlink signal and the uplink signal are transmitted and received by the base station eNB 10A in the form of packet, and processing on a packet header containing a transmission source address and a destination address is performed by executing the base station control program.

The quality information detecting unit 16 detects the quality information on the access links AL1 and AL2 and the backhaul link BL from the signal reproduced by the L1 receiving unit 12, and inputs predetermined quality information to the L2 unit 13, the number-of-allocations determining unit 18, and the allocation timing control unit 19. The L2 unit 13 performs statistical processing on the quality information input from the quality information detecting unit 16. As the quality information, for example, it is possible to use channel quality information (CQI) on each resource block that is measured by each mobile station and reported regularly to the base station. Examples of the index of the CQI include the received signal strength indicator (RSSI), the signal to interference noise ratio (SINR), and the carrier to interference noise ratio (CINR).

The traffic determining unit 17 refers to the traffic information which is collected by the L2 unit 13 and on which the statistical processing is performed by the L2 unit 13, to thereby determine a traffic amount of each of the links including the access links AL1 and AL2 and the backhaul link BL. Examples of the index of the traffic amount include a radio usage rate, a retransmission count, and a radio error rate.

Further, the number-of-allocations determining unit 18 determines the number of radio resources to be allocated to each of the links based on the result of determination by the traffic determining unit 17. The allocation timing control unit 19 determines an allocation timing based on the number of radio resources to be allocated which is input from the number-of-allocations determining unit 18 and the quality information on each of the links which is input from the quality information detecting unit 16. The L2 unit 13 is notified of allocation information including the number of radio resources to be allocated to each of the links and the allocation timing therefor, which are results thus determined, in order to use the allocation information for radio resource allocation processing to be performed later. The allocation information generating unit 20 sends the determined allocation information on the backhaul link BL to the L1 transmitting unit 14 at a timing of notifying the relay node RN.

[Relay Node]

Figure 4:
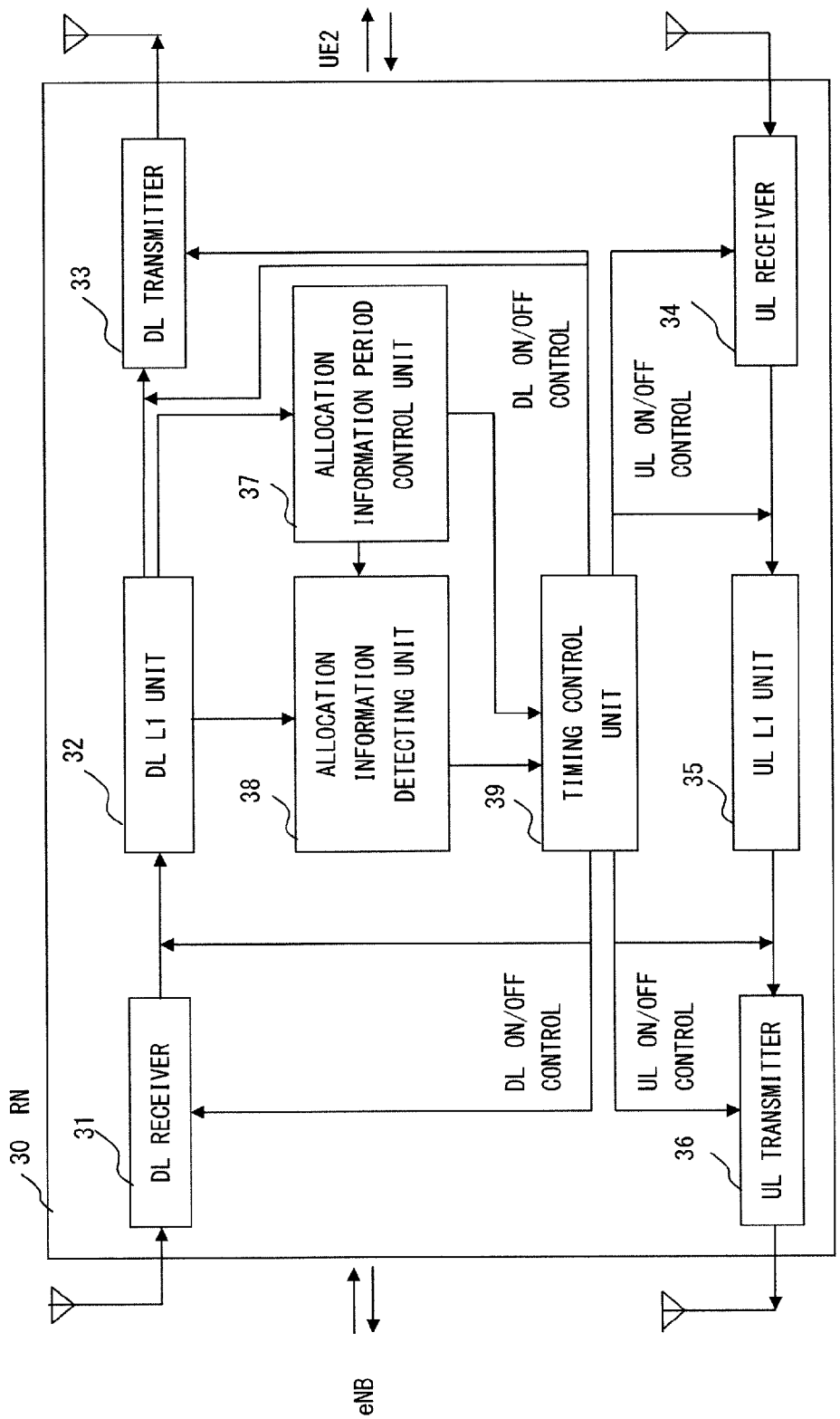
FIG. 4 illustrates a detailed configuration of a relay node according to the embodiment and the modified example.

FIG. 4 illustrates a detailed configuration of the relay node RN included in the mobile wireless communication system SYS according to the embodiment illustrated in FIGS. 1 and 2.

The relay node RN 30 illustrated in FIG. 4 includes a DL transmission/reception function part that relays and transmits to the radio terminal UE2 the downlink signal (user data, control data) received from the base station eNB via the backhaul link BL and that processes for reception the control data addressed to the relay node RN 30, a UL transmission/reception function part that relays and transmits to the base station eNB the uplink signal (user data, quality information) received from the radio terminal UE2 via the access link AL2 and that processes for transmission the quality information on the backhaul link BL collected in the relay node RN 30, and a control function part that controls the relay transmission based on the control data from the base station eNB 10A addressed to the relay node RN 30.

The DL transmission/reception function part includes a DL receiver 31, a DL L1 unit 32, and a DL transmitter 33. The DL receiver 31 receives the DLRF signal from the base station eNB via a first reception antenna, and converts the DLRF signal into the BB signal. The DL L1 unit 32 demodulates and decodes the BB signal received from the DL receiver 31 to reproduce data, and transmits to the DL transmitter 33 the BB signal to be relayed and transmitted. The DL transmitter 33 converts the BB signal transmitted from the DL L1 unit into the DLRF signal to transmit the DLRF signal to the radio terminal UE2 from a first transmission antenna.

The UL transmission/reception function part includes a UL receiver 34, a UL L1 unit 35, and a UL transmitter 36. The UL receiver 34 receives the ULRF signal from the radio terminal UE2 via a second reception antenna, and converts the ULRF signal into the BB signal. The UL L1 unit 35 demodulates and decodes the BB signal received from the UL receiver 34 to reproduce data, and transmits to the UL transmitter 36 the BB signal to be relayed and transmitted. The UL transmitter 36 converts the BB signal transmitted from the UL L1 unit into the ULRF signal to transmit the ULRF signal from a second transmission antenna.

The control function part includes an allocation information period control unit 37, an allocation information detecting unit 38, and a timing control unit 39. The control function part further includes a main control unit and a storage unit (not shown). The main control unit executes a relay node control program stored in advance in the storage unit, to thereby control the overall operation of the relay node RN. The downlink signal and the uplink signal are transmitted and received by the relay node RN in the form of packet, and processing on the packet header containing the transmission source address and the destination address is performed by executing the relay node control program.

The allocation information period control unit 37 determines a timing at which the relay node RN is to be notified of the allocation information based on the control data reproduced by the DL L1 unit 32. The allocation information detecting unit 38 receives the allocation information at the timing determined by the allocation information period control unit 37.

Further, based on the timing determined by the allocation information period control unit 37 and the allocation information detected by the allocation information detecting unit 38, the timing control unit 39 performs ON/OFF control on the transmitters 33 and 36, the receivers 31 and 34, the DL L1 unit 32, and the UL L1 unit 35. Specifically, as a countermeasure against a self-interference in the relay node RN during the inband connection, the timing control unit 39 needs to logically separate the first reception antenna and the first transmission antenna from each other or the second reception antenna and the second transmission antenna from each other, and therefore, based on the determined timing and the allocation information, the timing control unit 39 generates a DL ON/OFF control signal and a UL ON/OFF control signal to prevent the components of the DL transmission/reception function part or the components of the UL transmission/reception function part from operating at the same time.

[Radio Terminal]

Components of the radio terminals UE1 and UE2 included in the mobile wireless communication system SYS according to the embodiment illustrated in FIGS. 1 and 2 are not shown.

The radio terminal UE2 wirelessly connected to the relay node RN includes a reception function part that processes the downlink signal (user data, control data) received from the relay node RN via the access link AL2, a transmission function part that processes the uplink signal (user data, quality information) to be transmitted to the relay node RN via the access link AL2, and a control function part that performs predetermined processing based on the result of demodulation and decoding by the reception function part and that instructs the transmission function part to perform transmission processing in accordance with various kinds of received control data.

Moreover, the radio terminal UE1 wirelessly connected to the base station eNB 10A similarly includes a reception function part, a transmission function part, and a control function part. Each of the control function parts of the radio terminals UE1 and UE2 further includes a main control unit and a storage unit (not shown). The main control unit executes a terminal control program stored in advance in the storage unit, to thereby control the overall operation of the each of the radio terminals UE1 and UE2. The downlink signal and the uplink signal are transmitted and received by the each of the radio terminals UE1 and UE2 in the form of packet, and processing on the packet header containing the transmission source address and the destination address is performed by executing the terminal control program.

[Radio Resource Allocation Processing]

Figure 5:
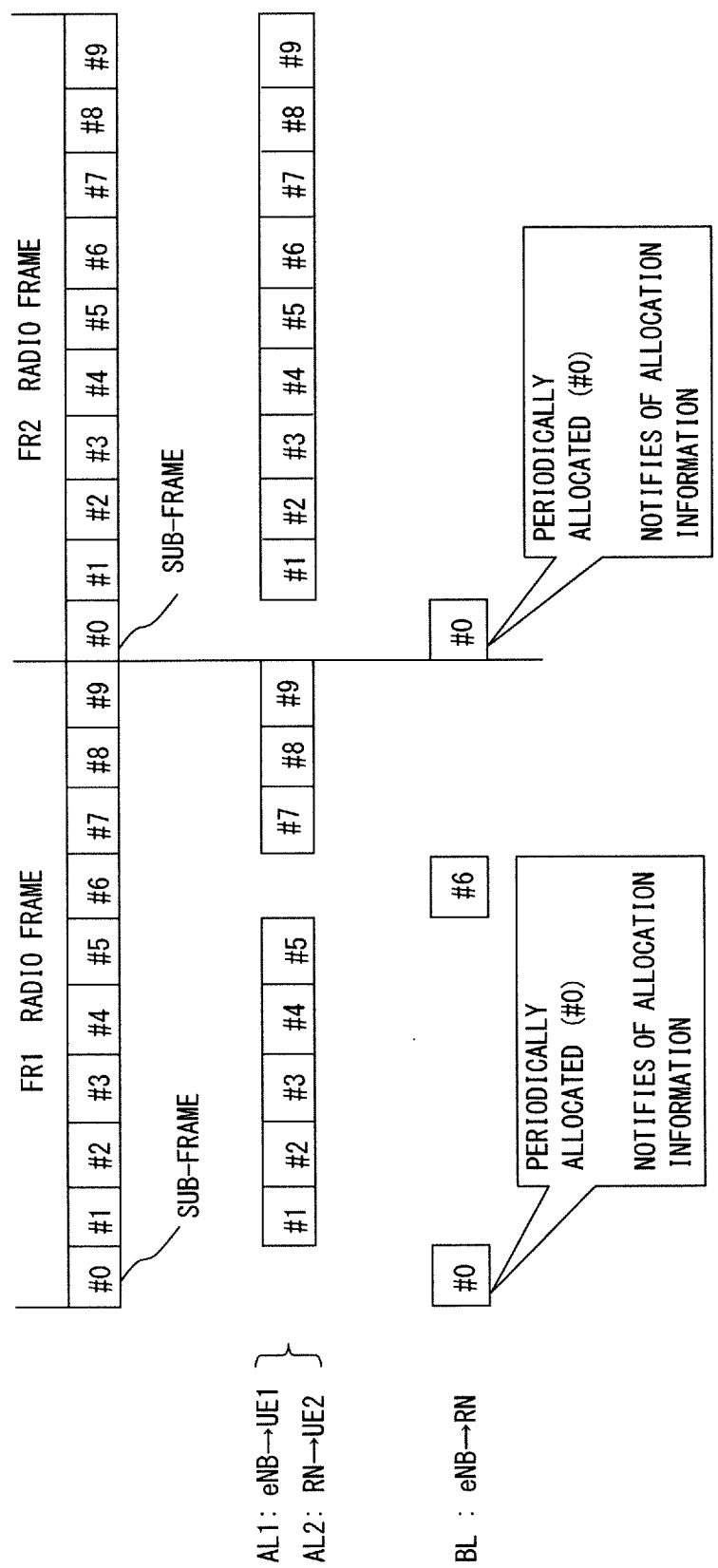
FIG. 5 illustrates an example of allocating radio resources according to the embodiment.

As illustrated in FIG. 5, in the mobile wireless communication system SYS according to the embodiment, ten sub-frames (#0 to #9) constituting one radio frame are each used as an allocation unit for the radio resources. In LTE, 12 adjacent sub-carriers to be transmitted in a radio section are handled as one group, which is defined as a resource block. Each of the ten sub-frames as the allocation unit for the radio resources corresponds to the resource block.

The base station eNB 10A determines the frequency band to be allocated to each of the relay node RN and the radio terminals UE1 and UE2 in units of the resource block. To this end, in the radio resource allocation processing of the base station eNB 10A, based on both the quality information and the traffic information which are collected for each of the access link AL1 used for direct communication between the radio terminal UE1 and the base station eNB 10A, the access link AL2 used for direct communication between the radio terminal UE2 and the relay node RN, and the backhaul link BL used for relay transmission between the base station eNB 10A and the relay node RN, of a plurality of the sub-frames in the radio frame as the radio resources, the number of sub-frames to be allocated to each of the access link AL1, the access link AL2, and the backhaul link BL and the allocation timing therefor are dynamically determined. Then, the base station eNB 10A notifies the relay node RN of the allocation information including the number of sub-frames to be allocated to the backhaul link BL used for the relay transmission and the allocation timing therefor in each period with the radio frame being used as the unit.

Through the radio resource allocation processing, in the example of downlink communication illustrated in FIG. 5, of a plurality of sub-frames of a first radio frame FR1, the sub-frames #1 to #5 and #7 to #9 are allocated to the access links AL1 and AL2, and of the plurality of sub-frames of the first radio frame FR1, the sub-frame #6 is allocated to the backhaul link BL.

Further, in a second radio frame FR2 subsequent to the first radio frame FR1 on the time axis, the sub-frames #1 to #9 are allocated to the access links AL1 and AL2, and none of the sub-frames is allocated to the backhaul link BL.

Attention is now focused on the first radio frame FR1, for example. The base station eNB 10A notifies, by a control channel of each sub-frame, the relay node RN of information on allocation correspondence between the sub-frames #1 to #5 and #7 to #9 and the access links AL1 and AL2 (that is, the radio terminals UE1 and UE2). Moreover, the base station eNB 10A notifies, by the sub-frame #0, the relay node RN of the allocation information indicating that the sub-frame #6 is allocated to the backhaul link BL. What is important is that the base station eNB 10A notifies, by the sub-frame #0, the relay node RN of the allocation information indicating that at least one sub-frame is allocated to the backhaul link BL in each period with the radio frame being used as the unit.

Next, a more detailed description is given of the radio resource allocation processing. Referring to both FIGS. 6 and 7, the base station eNB 10A executes the radio resource allocation processing in the following procedure.

Figure 7:
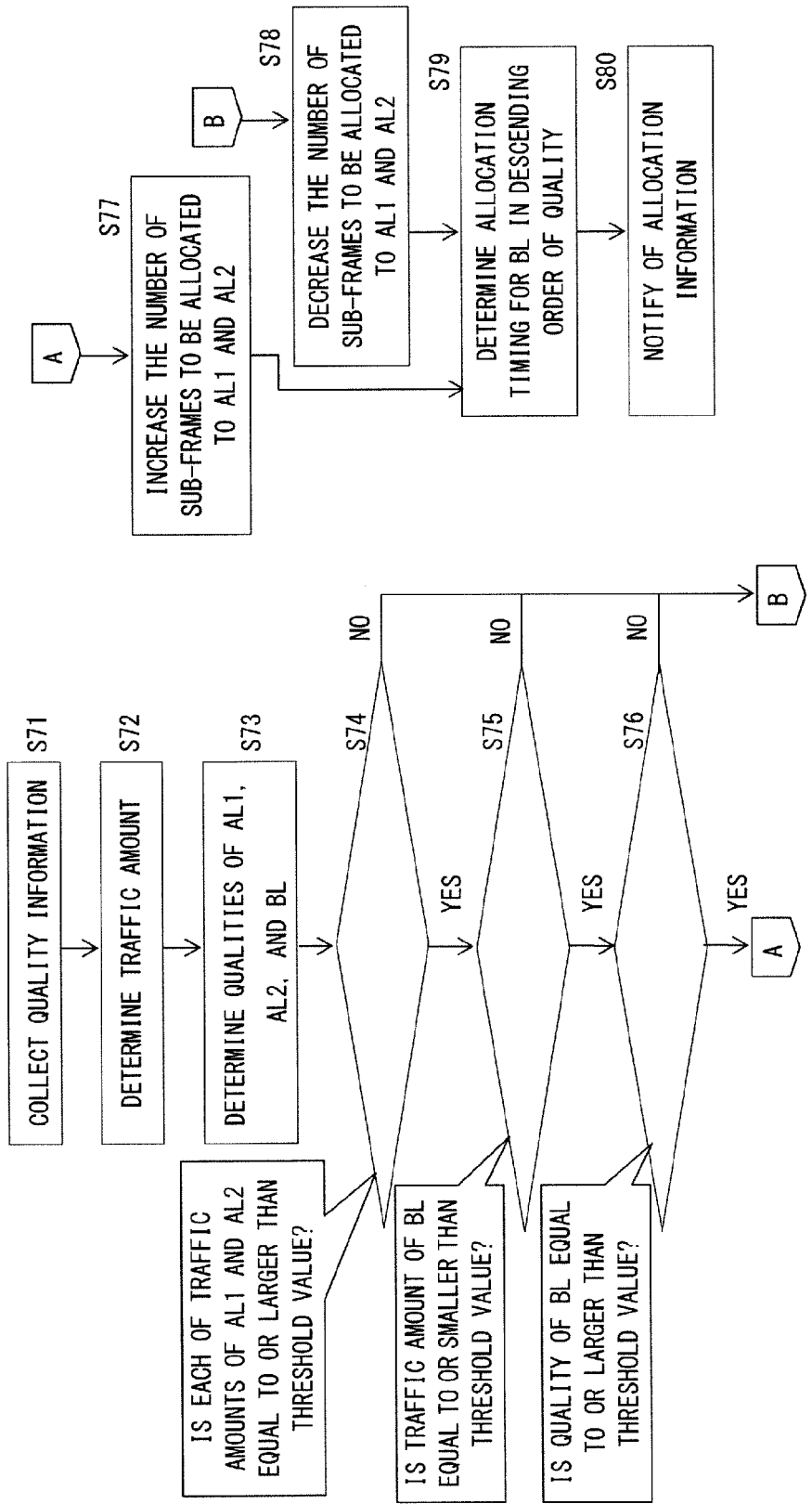
FIG. 7 is a flow chart illustrating the radio resource allocation processing according to the embodiment.

The quality information detecting unit 16 first receives (collects) the quality information on the access links AL1 and AL2 and the backhaul link BL from the radio terminals UE1 and UE2 and the relay node RN (S71 of FIG. 7). Note that, the quality information on the access link AL2 from the radio terminal UE2 is collected via the relay node RN.

The traffic determining unit 17 determines a traffic amount of each of the links including the access links AL1 and AL2 and the backhaul link BL, which is collected in advance by the L2 unit 13 and on which the statistical processing is performed by the L2 unit 13 (S72). The quality information detecting unit 16 determines qualities of the access links AL1 and AL2 and the backhaul link BL (S73).

When the number-of-allocations determining unit 18 determines, based on a result of determination of the traffic amount input from the traffic determining unit 17, that each of the traffic amounts of the access links AL1 and AL2 is equal to or larger than a threshold value (S74) and that the traffic amount of the backhaul link BL is equal to or smaller than a threshold value (S75), and further determines, based on a result of determination of the quality of the backhaul link BL input from the quality information detecting unit 16, that the quality of the backhaul link BL is equal to or larger than a threshold value (S76), the number-of-allocations determining unit 18 increases the number of sub-frames to be allocated to the access links AL1 and AL2 (S77).

When any one of determinations of conditions in the above-mentioned processing in S74, S75, and S76 is negative, the number-of-allocations determining unit 18 decreases the number of sub-frames to be allocated to the access links AL1 and AL2 (S78).

Following the above-mentioned processing in S77 or S78, the allocation timing control unit 19 refers to the result of determination of the qualities of the access links AL1 and AL2 and the backhaul link BL input from the quality information detecting unit 16 to determine the number of sub-frames to be allocated to the backhaul link BL and the allocation timing therefor in descending order of the quality of the sub-frame (S79).

When a notification timing for the allocation information determined in advance (timing corresponding to the sub-frame #0 of FIG. 5) arrives, the allocation information generating unit 20 generates the allocation information for notifying the relay node RN (in this case, notifies the relay node RN of the sub-frame #6), and outputs the allocation information to the L1 transmitting unit 14 (S80).

Figure 6:
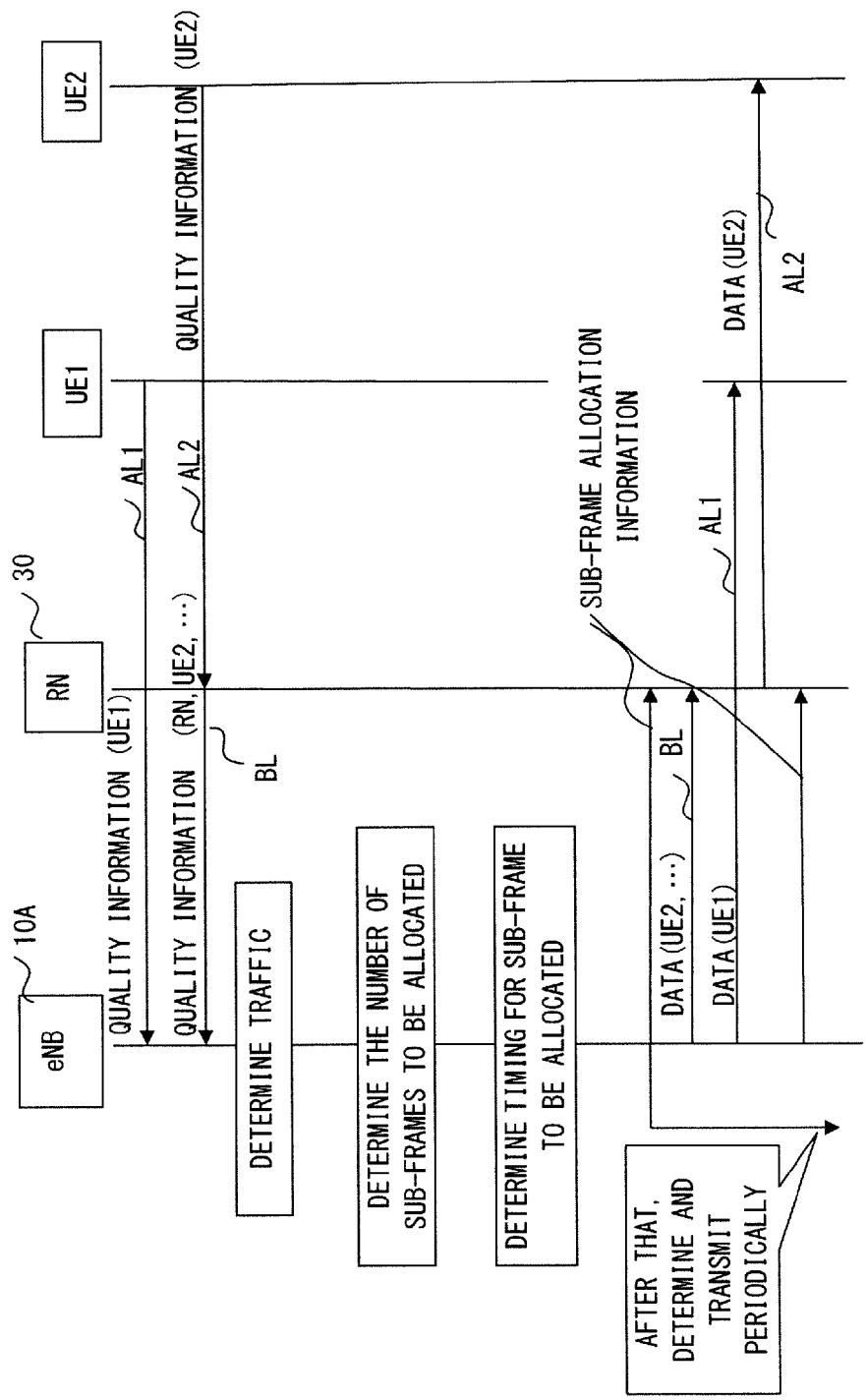
FIG. 6 is a sequence chart illustrating radio resource allocation processing according to the embodiment.

Note that, in FIG. 6, only the outline of the above-mentioned radio resource allocation processing is illustrated. The base station eNB 10A notifies the relay node RN of the allocation information indicating that the sub-frame is allocated to the backhaul link BL in a period determined in advance, and transmits data to the access link AL1 and the backhaul link BL. After that, the base station eNB 10A repeats notifying the relay node RN of the allocation information in the period determined in advance.

The relay node RN determines transmission/reception timings based on the allocation information received from the base station eNB 10A, and transmits data to the radio terminal UE2 to which the data needs to be relayed.

Note that, in the above-mentioned radio resource allocation processing, the downlink communication is exemplified, but the radio resource allocation processing is also applicable to uplink communication using different frequency bands (system bands) of the radio frame.

Effects of the Embodiment

As described above, in the mobile wireless communication system SYS according to the embodiment, as the traffic amounts of the access links AL1 and AL2 become larger, the number of radio resources to be allocated to the access links AL1 and AL2 is increased, and hence it is possible to increase the number of the radio terminals UE1 and UE2 capable of performing communication for each radio frame.

Further, control (scheduling) is performed based on actual usage states of both the access links AL1 and AL2 and the backhaul link BL, and hence an effect of increasing a frequency usage efficiency is enhanced.

Still further, the base station eNB 10A notifies the relay node RN of the allocation information on the backhaul link BL not in each sub-frame but in a period of at least once in the radio frame, and hence it is possible to attain the reduction in a signaling amount.

MODIFIED EXAMPLE

In the above-mentioned mobile wireless communication system SYS according to the embodiment (see FIGS. 1 and 2), the base station eNB 10A (see FIG. 3) notifies, by the sub-frame #0, the relay node RN (see FIG. 4) of the allocation information indicating that at least one sub-frame is allocated to the backhaul link BL used for the relay transmission between the base station eNB 10A and the relay node RN in each period with the radio frame being used as the unit (see FIG. 5).

Figure 8:
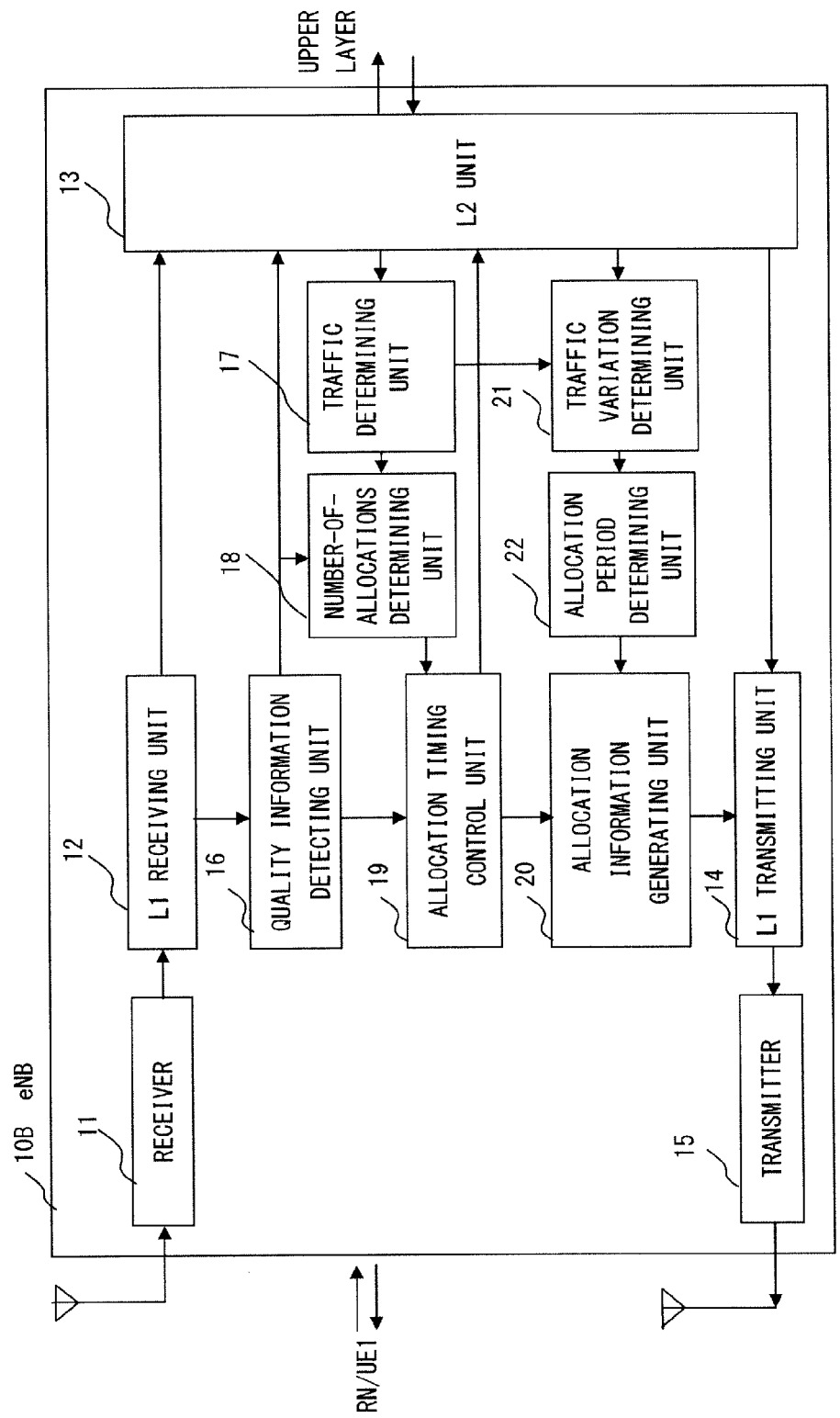
FIG. 8 illustrates a detailed configuration of a base station according to the modified example.

In a mobile wireless communication system SYS (see FIGS. 1 and 2) according to a modified example, a base station eNB 10B having a modified configuration illustrated in FIG. 8 notifies the relay node RN (see FIG. 4) of the allocation information indicating that at least one sub-frame is allocated to the backhaul link BL used for the relay transmission between the base station eNB 10B and the relay node RN by changing an allocation period in accordance with a variation amount of the traffic amount. In this control, the base station eNB 10B notifies, by the sub-frames #0 and #5, for example, the relay node RN of the allocation information in a period of at least twice in one radio frame.

In this example, a description to be given is limited to this modified feature. Referring to FIG. 8, the base station eNB 10B having the modified configuration includes, similarly to the base station eNB 10A, a reception function part, a transmission function part, and a control function part. The control function part further includes a traffic variation determining unit 21 and an allocation period determining unit 22, as well as the L2 unit 13, the quality information detecting unit 16, the traffic determining unit 17, the number-of-allocations determining unit 18, the allocation timing control unit 19, and the allocation information generating unit 20. Each of those components functions as a scheduler.

FIGS. 9 and 10 are respectively a flow chart and a sequence chart illustrating radio resource allocation processing performed by the base station eNB 10B. A processing procedure in S91 to S94 illustrated in FIG. 9 is the same as the processing procedure in S71 to S79 illustrated in FIG. 7. Further, in a sequence illustrated in FIG. 10, a sequence up to a traffic variation amount determination and an allocation period allocation determination is the same as that illustrated in FIG. 6.

Referring to all of FIGS. 8, 9 and 10, the traffic variation determining unit 21 refers to the result of determination by the traffic determining unit 17 of the traffic amount of each of the links including the access links AL1 and AL2 and the backhaul link BL to determine a variation amount of the traffic amount. In this determination, the traffic variation determining unit 21 determines whether or not the variation amount of the traffic amount of each of the links is equal to or larger than a threshold value determined in advance (S91 of FIG. 9).

The allocation period determining unit 22 determines (changes) the allocation period in accordance with a result of determination by the traffic variation determining unit 21 of the variation amount of the traffic amount, and inputs control period information to the allocation information generating unit 20. Specifically, when it is determined that the variation amount of the traffic amount of each of the links is equal to or larger than the threshold value, the allocation period determining unit 22 determines to shorten the allocation period (S92), and when it is determined that the variation amount of the traffic amount of each of the links is smaller than the threshold value, the allocation period determining unit 22 determines to lengthen the allocation period (S93). The allocation period determining unit 22 then generates corresponding control period information.

The allocation information generating unit 20 sends, at a timing for notifying the relay node RN, the determined allocation information and control period information on the backhaul link BL to the L1 transmitting unit 14 (S94).

Through this processing, the base station eNB 10B notifies the relay node RN of the allocation information and the control period information on the sub-frame with respect to the backhaul link BL in the determined period, and transmits data to the access link AL1 and the backhaul link BL. After that, the base station eNB 10B repeats notifying the relay node RN of the allocation information and the control period information in the determined period.

In the relay node RN, the allocation information period control unit 37 determines the timing at which the relay node RN is to be notified of the allocation information based on the control data (control period information) reproduced by the DL L1 unit 32, and the relay node RN operates in the same manner. Further, the relay node RN transmits data to the radio terminal UE2 to which the data needs to be relayed.

Effect of Modified Example

As described above, in the mobile wireless communication system SYS according to the modified example, it is further possible to determine the period for notifying the relay node RN of the allocation information in accordance with the variation amount of the traffic amount to be a plurality of times in each radio frame under the condition that one sub-frame is not used as the minimum unit.

[Others]

The above-mentioned pieces of processing according to the embodiment and the modified example may be provided as a program executable by a computer, and the program may be provided via a non-transitory storage medium such as a CD-ROM and a flexible disk, or alternatively, via a communication line.

Moreover, each of the above-mentioned pieces of processing according to the embodiment and the modified example may be implemented by combining a plurality of arbitrary ones of the pieces of processing or all of the pieces of processing.

What is claimed is:

1. A radio base station apparatus, comprising:
   a determining unit that dynamically determines, based on both quality information and traffic information which are collected for each of a first link used for direct communication between a first radio terminal and the radio base station apparatus, a second link used for direct communication between a second radio terminal and a fixed radio relay apparatus, and a third link used for relay transmission between the radio base station apparatus and the fixed radio relay apparatus, of a plurality of sub-frames in a radio frame as radio resources, a number of sub-frames to be allocated to each of the first link, the second link, and the third link and an allocation timing therefor; and a notifying unit that notifies the fixed radio relay apparatus of allocation information including the number of sub-frames to be allocated to the third link used for the relay transmission and the allocation timing therefor in a period of at least once in each radio frame and at a predetermined notification timing in each radio frame without needing to request for a radio resource from the fixed radio relay apparatus, the number of sub-frames and the allocation timing as the allocation information having been dynamically determined based on both the quality information and the traffic information.

2. The radio base station apparatus according to claim 1, wherein the traffic information comprises a traffic amount, and wherein the radio base station apparatus further comprises a determining unit that determines the period for notifying the fixed radio relay apparatus of the allocation information in accordance with a variation amount of the traffic amount to be a plurality of times in each radio frame under a condition that one sub-frame is not used as a minimum unit.

3. The radio base station apparatus according to claim 1, wherein the traffic information comprises a traffic amount based on any one of a radio usage rate, a retransmission count, and a radio error rate.

4. The radio base station apparatus according to claim 1, wherein each of the first link and the second link comprise an access link and the third link comprises a backhaul link.

5. The radio base station apparatus according to claim 1, wherein the period of at least once and the predetermined notification timing correspond to the first sub-frame in the sub-frames.

6. A radio resource allocation method, comprising:

dynamically determining, by a radio base station apparatus, based on both quality information and traffic information which are collected for each of a first link used for direct communication between a first radio terminal and the radio base station apparatus, a second link used for direct communication between a second radio terminal and a fixed radio relay apparatus, and a third link used for relay transmission between the radio base station apparatus and the fixed radio relay apparatus, of a plurality of sub-frames in a radio frame as radio resources, a number of sub-frames to be allocated to each of the first link, the second link, and the third link and an allocation timing therefor; and notifying, by the radio base station apparatus, the fixed radio relay apparatus of allocation information including the number of sub-frames to be allocated to the third link used for the relay transmission and the allocation timing therefor in a period of at least once in each radio frame and at a predetermined notification timing in each radio frame without needing to request for a radio resource from the fixed radio relay apparatus, the number of sub-frames and the allocation timing as the allocation information having been dynamically determined based on both the quality information and the traffic information.

7. A wireless communication system, comprising:

a radio base station apparatus that directly communicates to/from a first radio terminal by using a first link; and a fixed radio relay apparatus that directly communicates to/from a second radio terminal by using a second link, and performs relay transmission to/from the radio base station apparatus by using a third link, wherein the radio base station apparatus is configured to:

dynamically determine, based on both quality information and traffic information which are collected for each of the first link, the second link, and the third link, of a plurality of sub-frames in a radio frame as radio resources, a number of sub-frames to be allocated to each of the first link, the second link, and the third link and an allocation timing therefor; and notify the fixed radio relay apparatus of allocation information including the number of sub-frames to be allocated to the third link used for the relay transmission and the allocation timing therefor in a period of at least once in each radio frame and at a predetermined notification timing in each radio frame without needing to request for a radio resource from the fixed radio relay apparatus, the number of sub-frames and the allocation timing as the allocation information having been dynamically determined based on both the quality information and the traffic information.

* * * * *